(12) United States Patent
Ramakrishna et al.

(10) Patent No.: US 12,483,309 B2
(45) Date of Patent: Nov. 25, 2025

(54) BEAMFORMING WEIGHTS COMPRESSION ON A FRONTHAUL LINK IN WIRELESS COMMUNICATIONS SYSTEMS

(71) Applicant: Altiostar Networks, Inc., Tewksbury, MA (US)

(72) Inventors: Raghavendra Madanahally Ramakrishna, Bengaluru (IN); Vivek Jha, Bengaluru (IN)

(73) Assignee: Altiostar Networks, Inc., Tewksbury, MA (US)

( * ) Notice: Subject to any disclaimer, the term of this patent is extended or adjusted under 35 U.S.C. 154(b) by 42 days.

(21) Appl. No.: 18/013,805

(22) PCT Filed: Aug. 25, 2022

(86) PCT No.: PCT/US2022/041494
§ 371 (c)(1),
(2) Date: Dec. 29, 2022

(87) PCT Pub. No.: WO2023/064044
PCT Pub. Date: Apr. 20, 2023

(65) Prior Publication Data
US 2024/0106506 A1    Mar. 28, 2024

(30) Foreign Application Priority Data
Oct. 11, 2021   (IN) .............................. 202111046241

(51) Int. Cl.
*H04B 7/06*    (2006.01)
(52) U.S. Cl.
CPC ......... *H04B 7/0617* (2013.01); *H04B 7/0623* (2013.01); *H04B 7/0634* (2013.01)

(58) Field of Classification Search
CPC .. H04B 7/0617; H04B 7/0623; H04B 7/0634; H04W 88/085
See application file for complete search history.

(56) References Cited

U.S. PATENT DOCUMENTS

2018/0227028 A1    8/2018  Lee
2020/0186224 A1*   6/2020  Ahmed Salem ..... H04B 7/0486
(Continued)

FOREIGN PATENT DOCUMENTS

WO    WO-2021066855 A1    4/2021
WO    WO-2021090109 A1    5/2021

OTHER PUBLICATIONS

International Search Report and Written Opinion for International Patent Application No. PCT/US22/41494 mailed Dec. 23, 2022.

*Primary Examiner* — Tejis Daya
(74) *Attorney, Agent, or Firm* — Sughrue Mion, PLLC

(57) ABSTRACT

A method, a system, and a computer program for performing beam space compression. At least one signal is received at a first communication device. The first communication device is communicatively coupled to a second communication device using at least one communication interface. One or more beamforming coefficients are generated for transmission of the received at least one signal to the second communication device using one or more first antenna ports of the first communication device. One or more multi-dimensional, multi-domain compression is applied to the generated one or more beamforming coefficients. The received signal is transmitted using one or more first antenna ports associated with the one or more compressed beamforming coefficients to the second communication device.

20 Claims, 20 Drawing Sheets

(56) References Cited

U.S. PATENT DOCUMENTS

| | | |
|---|---|---|
| 2020/0389396 A1 | 12/2020 | Scott et al. |
| 2023/0131135 A1* | 4/2023 | Sahin .................. H04B 7/0456 375/267 |
| 2024/0421867 A1* | 12/2024 | Huang ................ H04B 7/0663 |

* cited by examiner

BEAMFORMING WEIGHTS COMPRESSION ON A FRONTHAUL LINK IN WIRELESS COMMUNICATIONS SYSTEMS

CROSS-REFERENCE TO RELATED APPLICATIONS

The present application claims priority to and is the 35 U.S.C. § 371 United States National Phase application based on International Patent Application No. PCT/US22/41494, filed Aug. 25, 2022, and entitled "Beamforming Weights Compression On A Fronthaul Link In Wireless Communications Systems," which claims priority to Indian Patent Appl. No. 202111046241 to Raghavendra Madanhally Ramakrishna, filed Oct. 11, 2021, and entitled "Beamforming Weights Compression on a Fronthaul Link in Wireless Communications Systems", and incorporates their disclosures herein by reference in their entireties.

TECHNICAL FIELD

In some implementations, the current subject matter relates to telecommunications systems, and in particular, to beam space compression on a fronthaul link in wireless communications systems, such as, for example, 5G New Radio ("NR").

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A fronthaul network, that can connect various devices in the wireless communication system, can be restricted to certain amounts of bandwidth. Any additional data/signals that may need to be transmitted in the fronthaul network can unnecessarily consume such bandwidth and thus, have an undesired effect on the functioning of the communication system. As such, to ensure effective operation of the fronthaul network, it is important to reduce consumption of such bandwidth associated with beamforming operations.

SUMMARY

In some implementations, the current subject matter relates to a computer implemented method for performing beam space compression. The method can include receiving at least one signal at a first communication device, the first communication device being communicatively coupled to a second communication device using at least one communication interface; generating one or more beamforming coefficients for transmission of the received at least one signal to the second communication device using one or more first antenna ports of the first communication device; applying one or more multi-dimensional, multi-domain compression to the generated one or more beamforming coefficients; and transmitting, using one or more first antenna ports associated with the one or more compressed beamforming coefficients, the received signal to the second communication device.

In some implementations, the current subject matter can include one or more of the following optional features. In some implementations, a base station can include at least one of the first communication device and the second communication device. At least one of the first communication device and the second communication device can include at least one of the following: one or more radio interface units, one or more distributed units, and any combination thereof The distributed units can be configured to interface with the radio interface units for the transmitting of data packets. The first communication device can include a distributed unit, and the second communication device can include a radio interface unit. The first communication device and the second communication device can be communicatively coupled using a fronthaul link.

In some implementations, the beamforming coefficients can include one or more beamforming weights. The beamforming weights can be configured to be compressed in at least one of: one or more different dimensions, one or more different domains, and any combination thereof. The beamforming weights can be configured to include at least one of the following: user/user-group defined beamforming weights, dynamically determined beamforming weights, statically determined beamforming weights, semi-statically determined beamforming weighs, and any combination thereof. The compressed beamforming weights can be transmitted to the second communication device using the at least one communication interface.

The applying can include applying one or more multi-dimensional, multi-domain inverse fast Fourier transform processing to the beamforming weights. Each user-defined beamforming weight can be configured to be compressed in one or more different dimensions or one or more different domains. The different dimensions can include at least one of the following: a single-dimensional compression, a two-dimensional compression, a three-dimensional compression, a multi-dimensional compression, and any combination thereof. The beamforming weights associated with compression in the one or more different dimensions and/or one or more different domains can be determined based on at least one or more radio resources associated with the at least one communication interface and transmitted by the first communication device to the second communication device via the at least one communication interface.

In some implementations, the method can further include determining, based on the applying, transmission power levels of the first antenna ports, comparing the determined transmission power levels to one or more predetermined threshold power levels, and selecting, based on the comparing, at least one first antenna element in the first antenna ports having a power level greater than the one or more predetermined threshold power levels for the transmitting.

In some implementations, the transmitting can include transmitting the received signal using multiple input multiple output processing. The multiple input multiple output processing can include at least one of the following: a single-site multiple input multiple output processing, a multiple-site multiple input multiple output processing, and a distributed multiple input multiple output processing.

In some implementations, the base station can include at least one of the following: a base station, an eNodeB base station, a gNodeB base station, a wireless base station, a wireless access point, and any combination thereof. The base station can be a base station operating in at least one of the following communications systems: a long term evolution communications system, a new radio communications system, and/or a wireless communication system.

In some implementations, the compression can be performed using at least one of the following domains: a spatial domain, a delay domain, a Doppler domain, a frequency domain, a multi-path domain, a time domain, an azimuth angle domain, an elevation angle domain, a vertical antenna dimension, a horizontal antenna dimension, an antenna polarization dimension, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

The current subject matter can provide for systems and methods that can be implemented in lower layer split architecture for wireless communications systems. Such systems can include various wireless communications systems, including 5G New Radio communications systems, long term evolution communication systems, etc.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
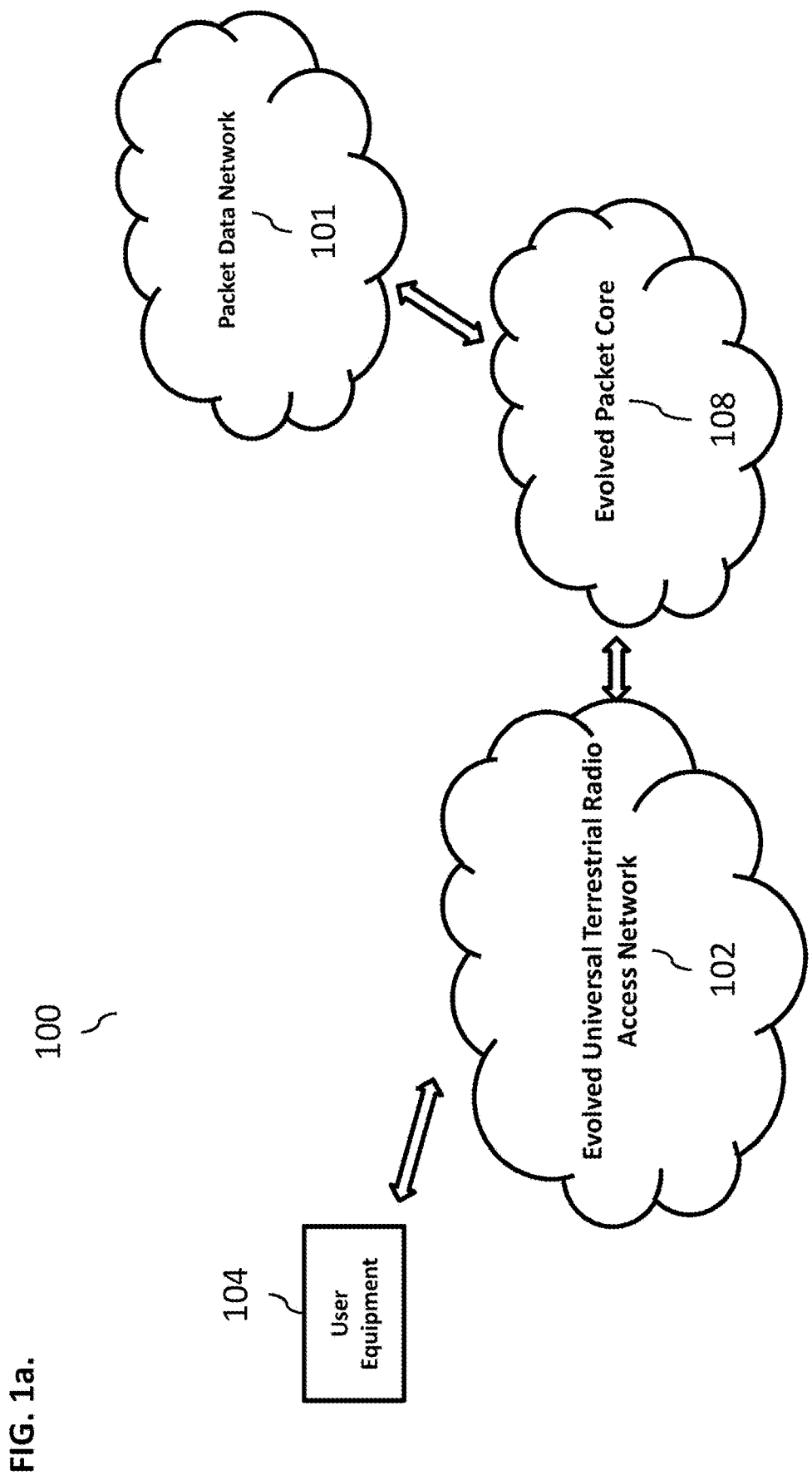
FIG. 1a illustrates an exemplary conventional long term evolution ("LTE") communications system.
Figure 1B:
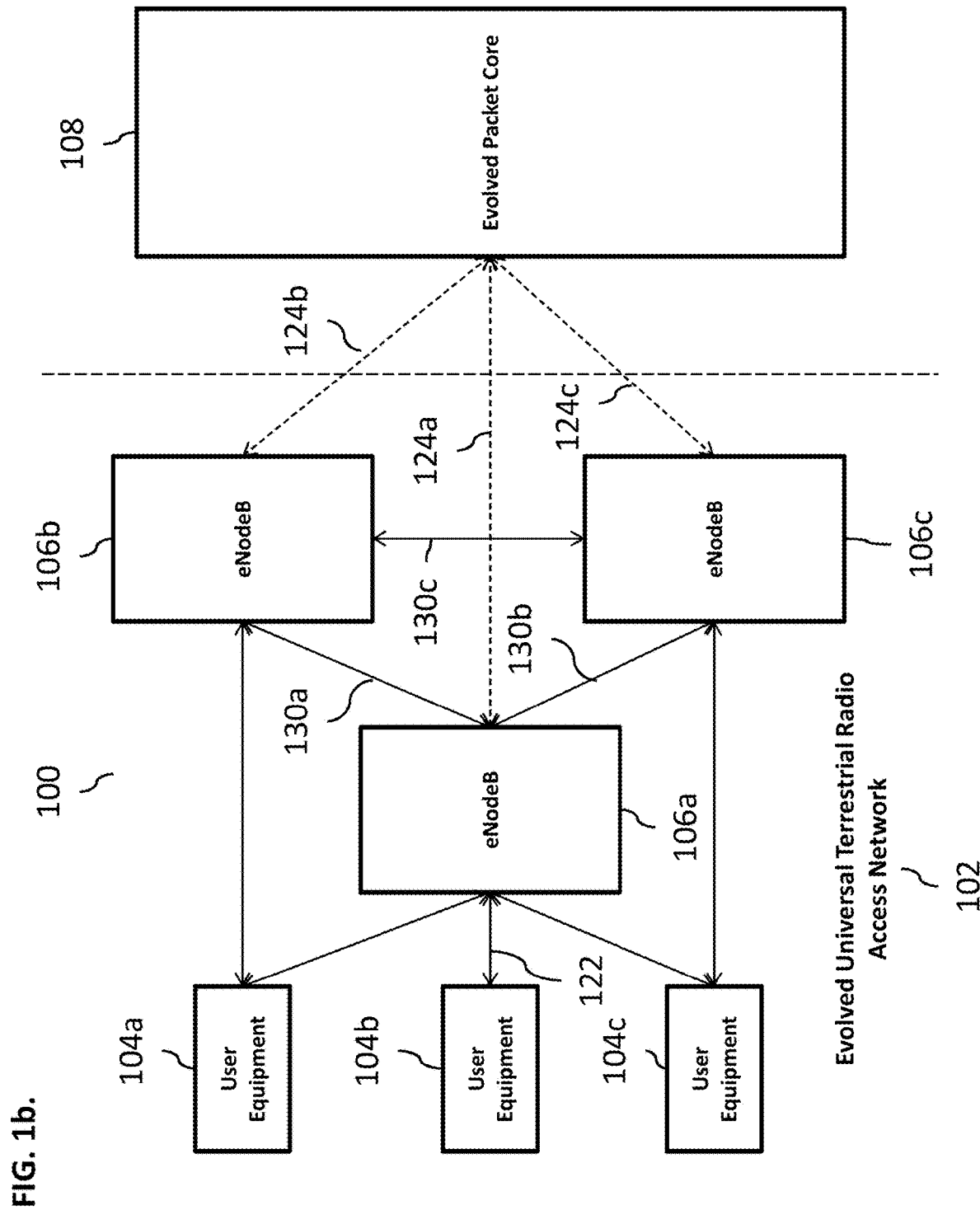

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
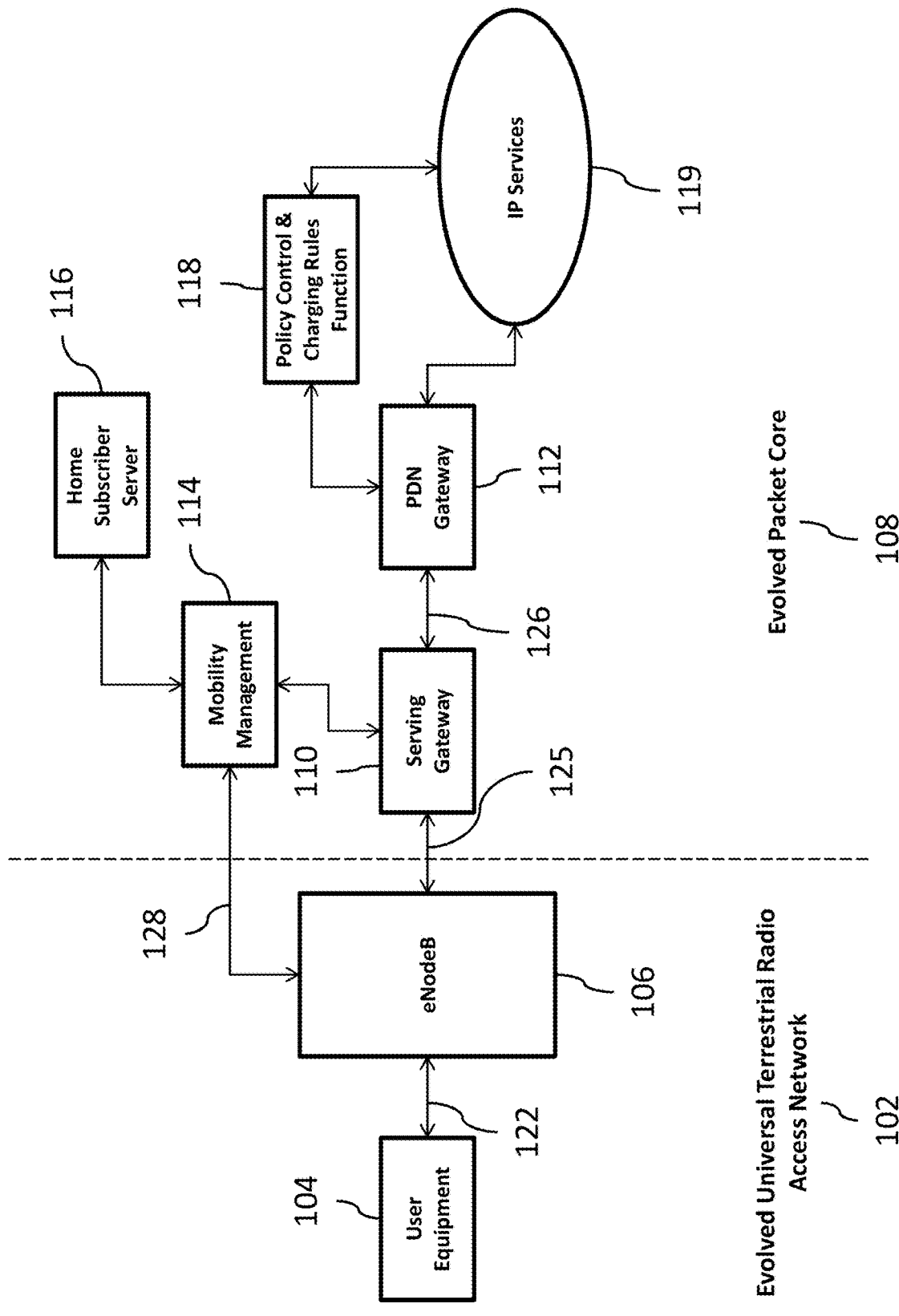

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
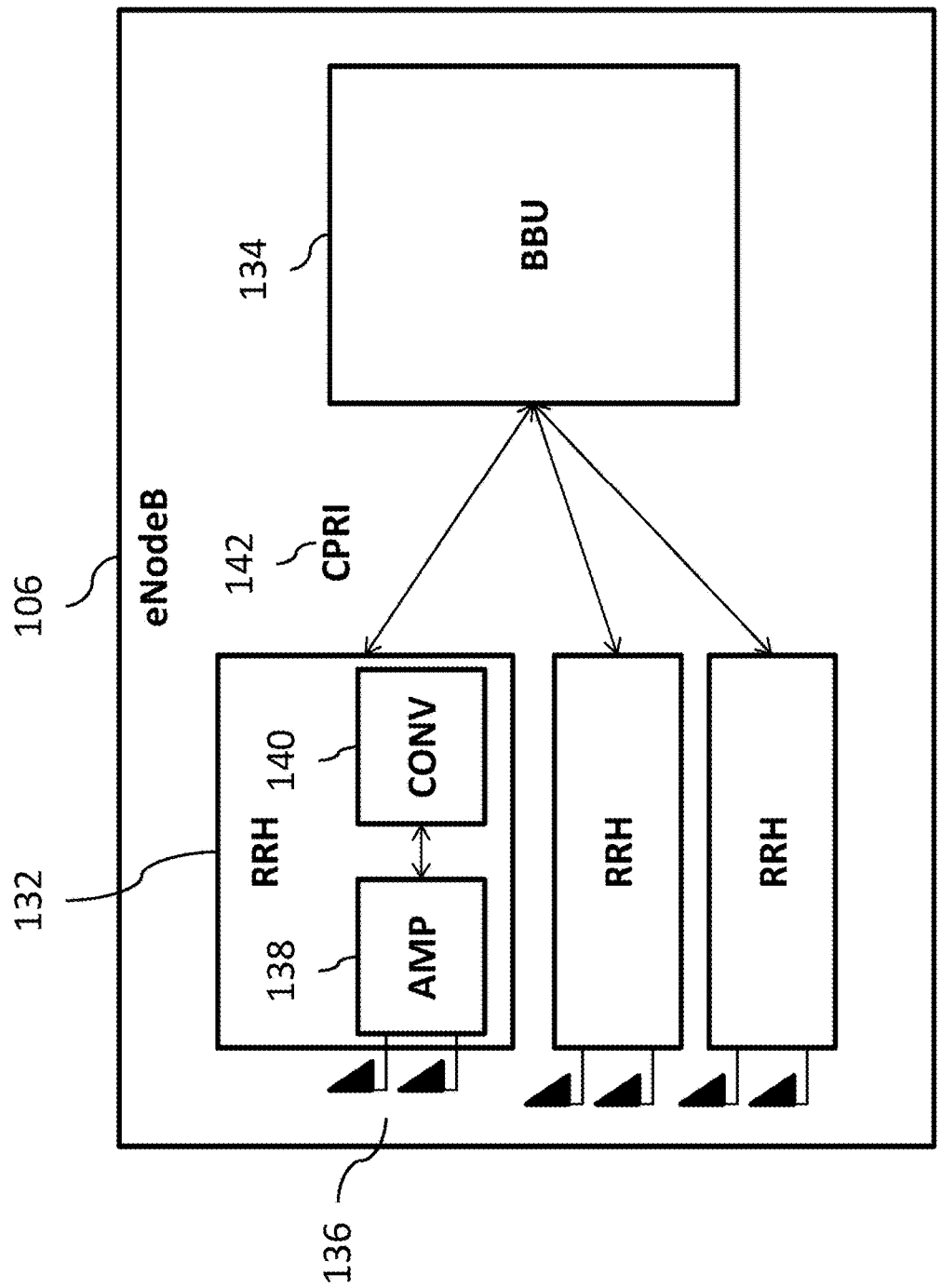

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
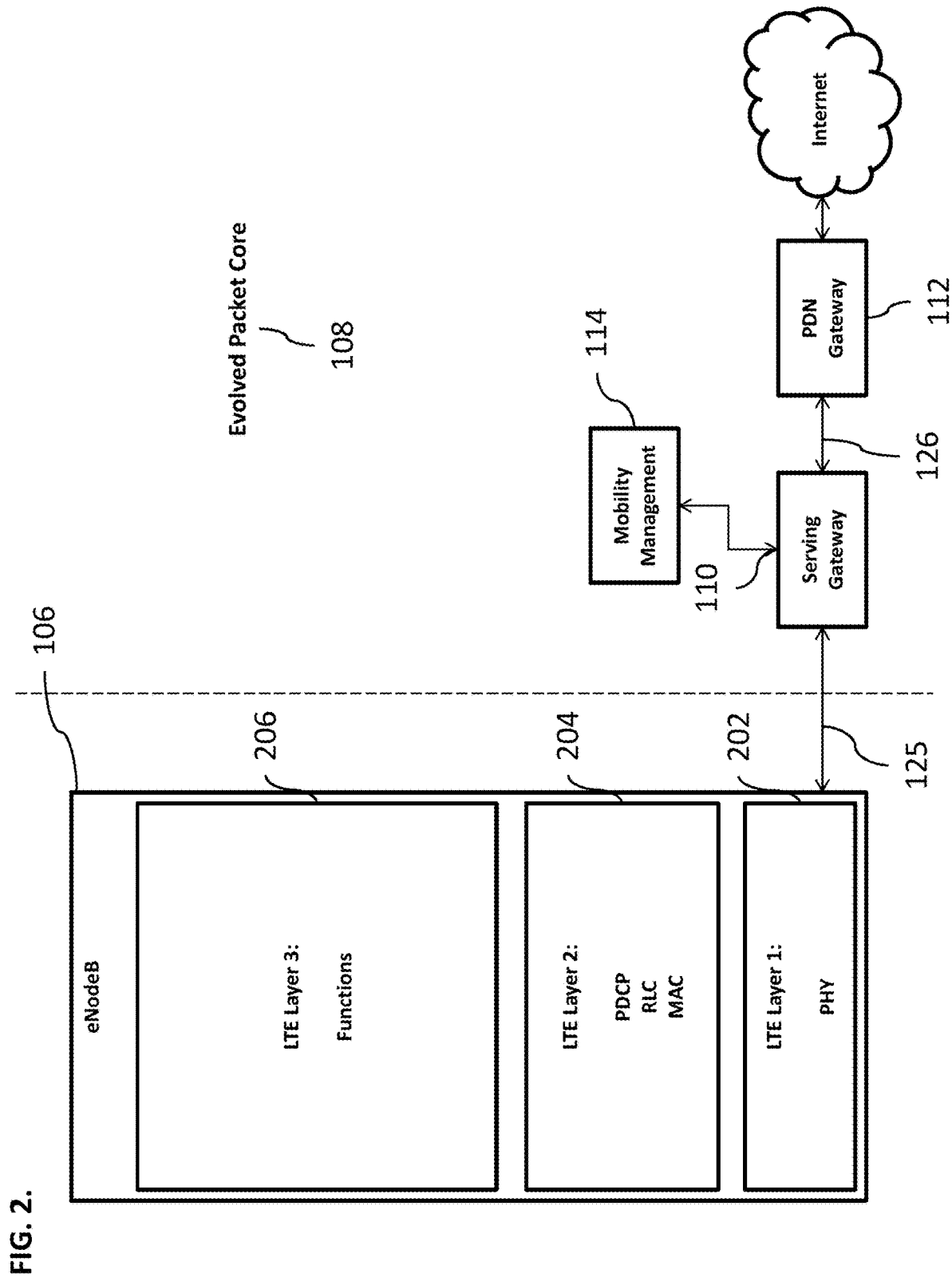
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
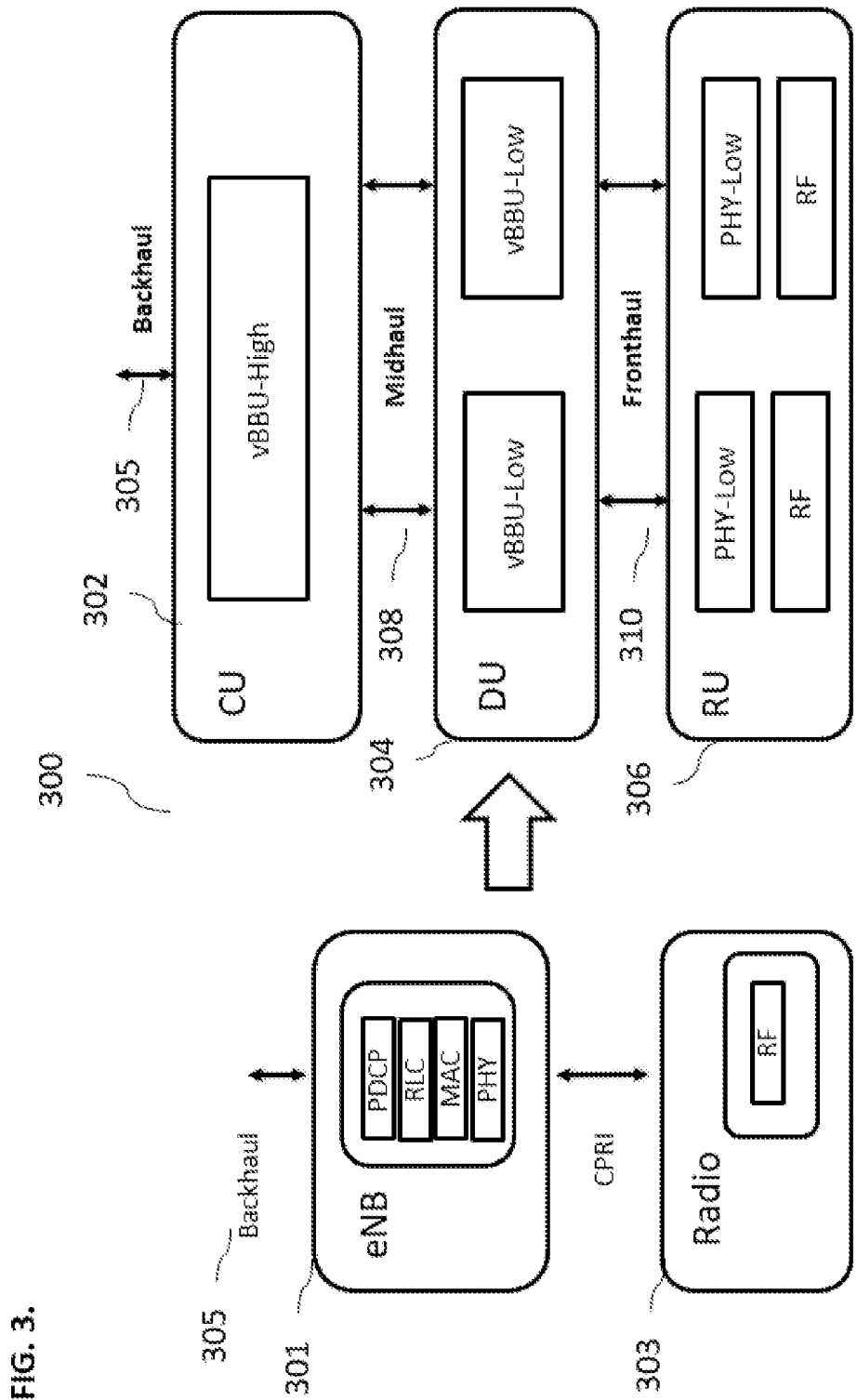
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
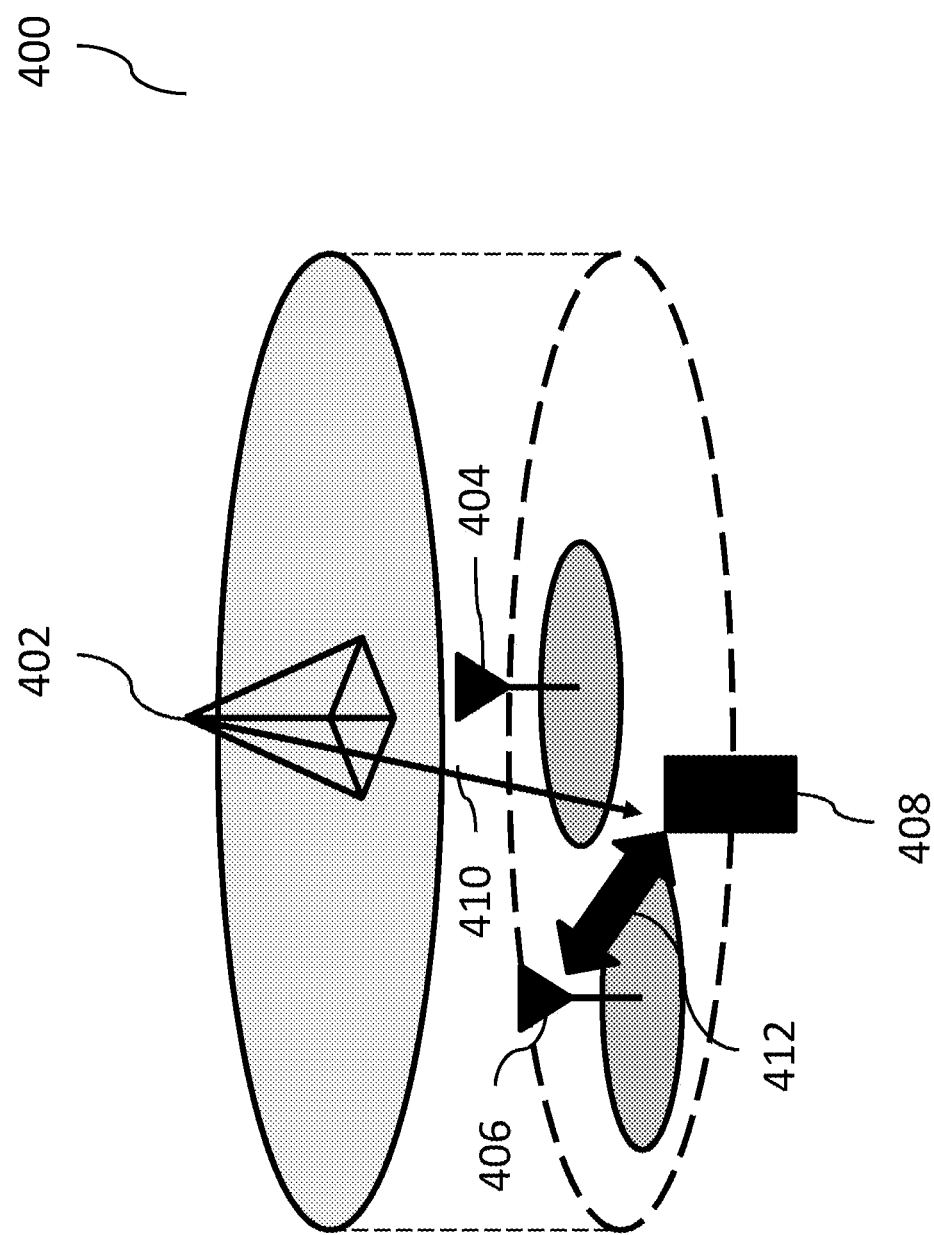
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE PUCCH and NR PUCCH can be transmitted on the same frequency.

Figure 5A:
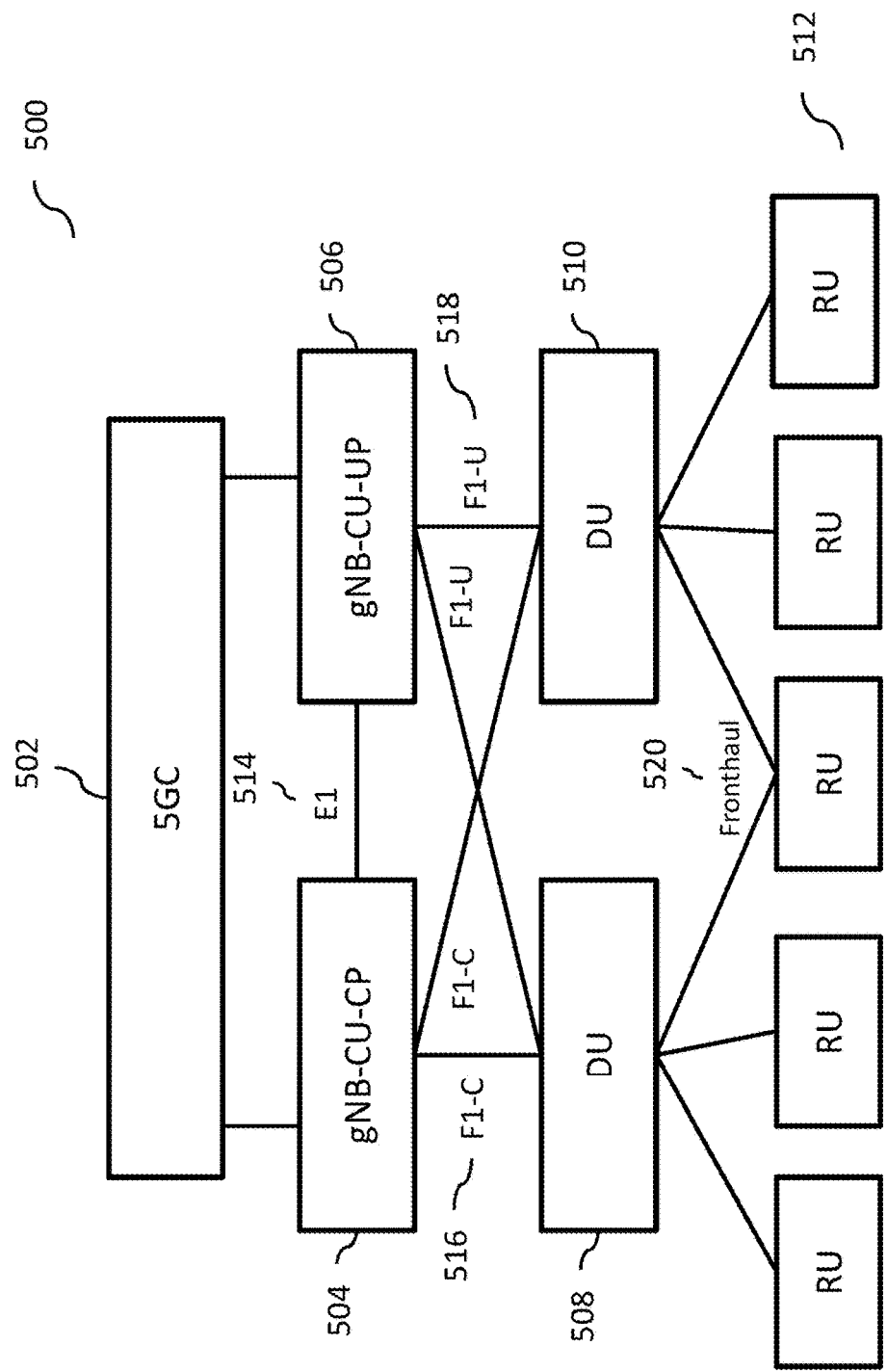
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the lower layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
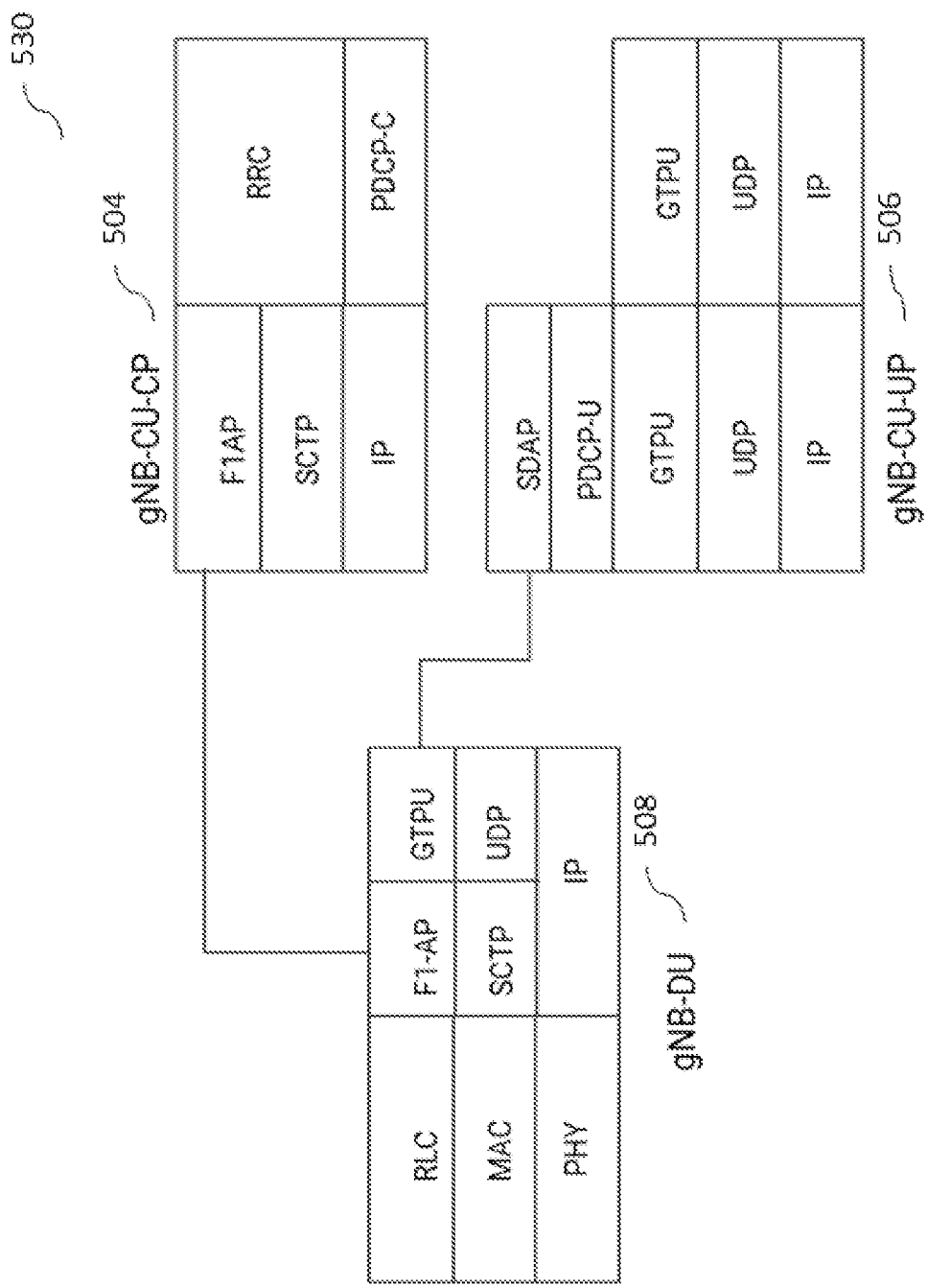
FIG. 5b illustrates an exemplary layer architecture of the split gNB.

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
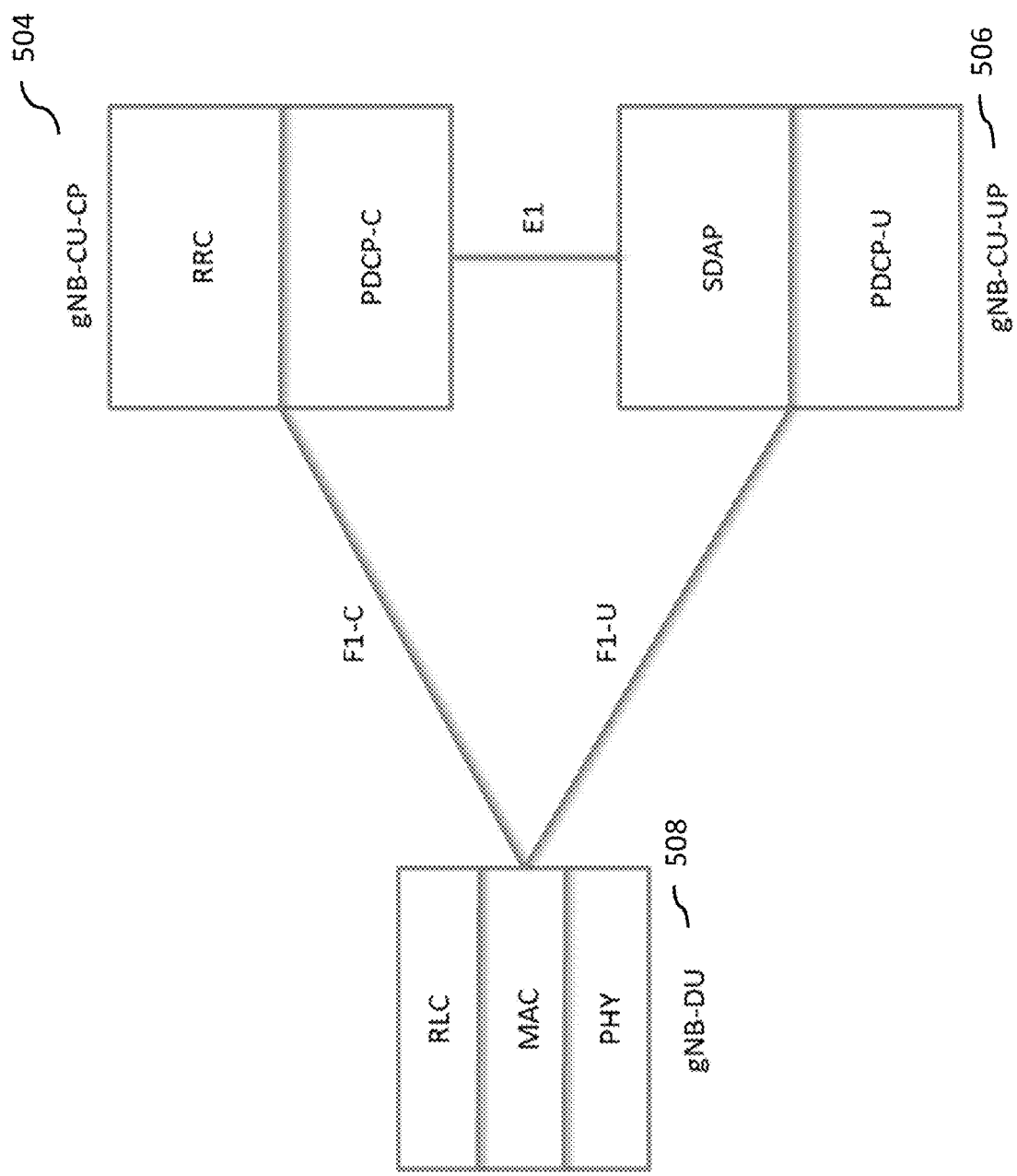
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Beam Space Compression in Wireless Communications Systems

In some implementations, to address various deficiencies of conventional systems, the current subject matter can be configured to perform compression of beamforming weights on fronthaul links between a distributed unit and a radio/remote unit. Beamforming can refer to processing of signals for directional signal transmission or reception. This can be achieved by combining elements in an antenna in such a way that signals at particular angles experience constructive interference while others—destructive interference. Beamforming can be used for transmission and receiving to achieve spatial selectivity. In wireless communications, there are two classes of beamforming: a direction of arrival beamforming (e.g., adjustment of receive or transmit antenna direction), and eigen beamforming (e.g., maximization of signal power at the receive antenna based on various criteria). To maximize throughput of multi-layer antenna systems, precoding is used for multi-layer beamforming, where precoding can be a beamforming scheme to support multi-layer transmission in a MIMO system. Using precoding, multiple streams can be transmitted from an antenna using independent weights per antenna to maximize throughput at the receiver output.

Beamforming weights can consume a substantial portion of a payload of a transmitted packet (e.g., from a distributed unit to a radio unit) over a fronthaul interface, which can be especially problematic in massive MIMO systems. A massive MIMO system can be an arrangement of multi-user MIMO (MU-MIMO) systems having large number of antenna elements at base stations and large numbers of antennas at terminals. In massive MIMO systems, antennas (e.g., hundreds, thousands) connected to a base station simultaneously work for a smaller number (e.g., tens, hundreds) terminals using similar time and carrier frequency resources.

An amount of bandwidth that can be required to transfer such beamforming weights from a distributed unit to a radio unit can increase substantially in view of the number of transmissions between the units (and/or the number of transmission antenna elements used by the units). This problem can be exacerbated by the flexible allocations in the NR wireless communications systems in time and frequency (e.g., non-slot allocations). As such, to reduce consumption of bandwidth (especially, in restrictive link bandwidth scenarios), the current subject matter can be configured to execute an efficient beamforming weight compression process.

To provide compression of beamforming weights, one or more of the distributed units and/or the remote/receiving units can include an inverse fast Fourier transform ("IFFT") and/or fast Fourier transform ("FFT") components. One-dimensional IFFT/FFT processing can be performed for the purposes of compression of beamforming weights. Columns of the one dimensions IFFT/FFT matrix can be used.

Figure 6A:
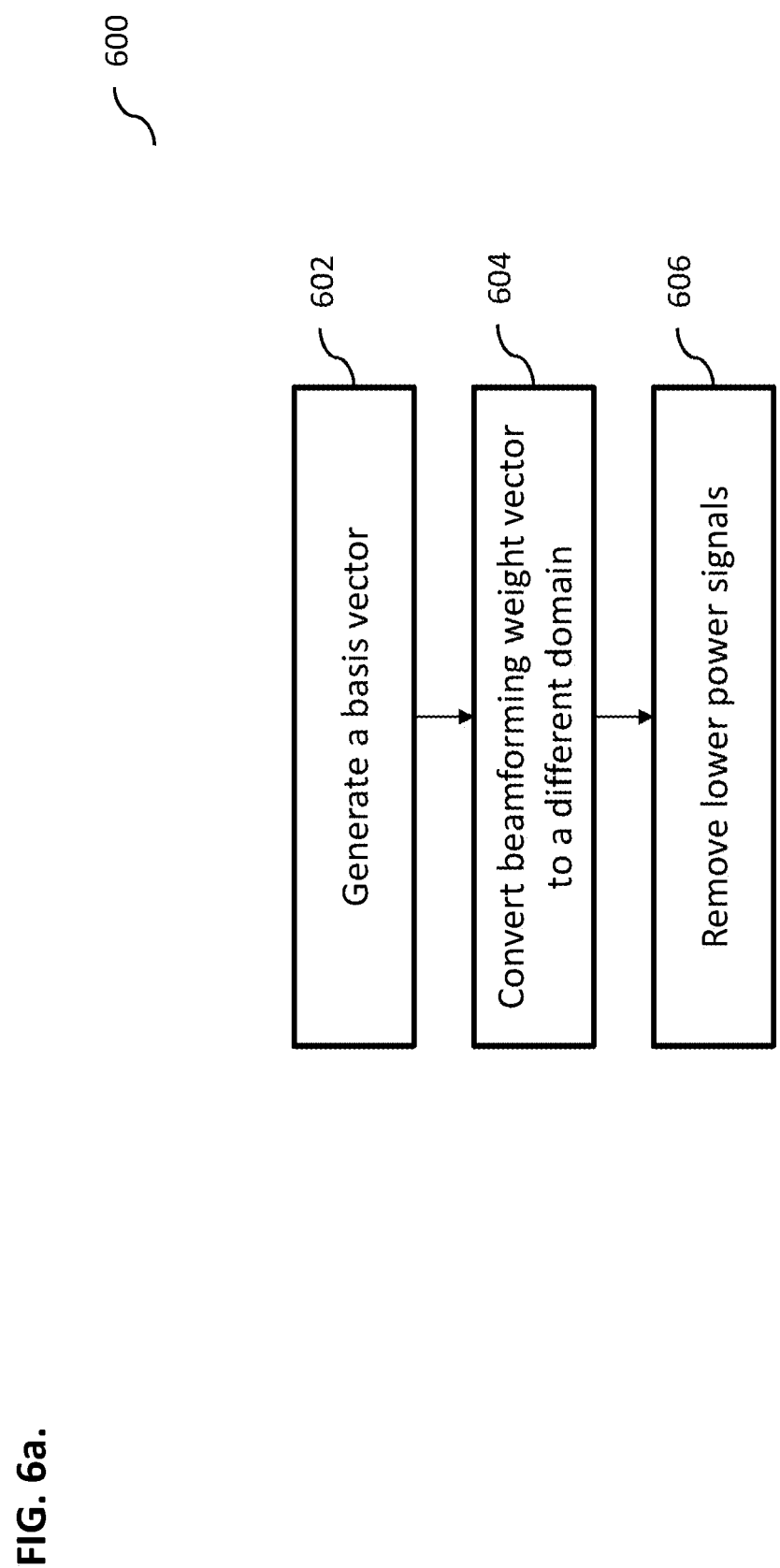
FIG. 6a illustrates an exemplary method for performing compression of beamforming weights.
Figure 6B:
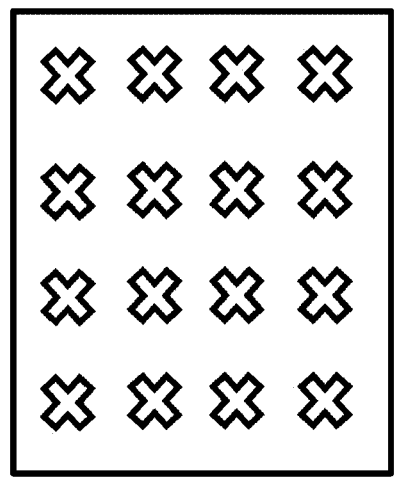
FIG. 6b illustrates an exemplary mxn TRX/antenna ports grid assembly.

FIG. 6a illustrates an exemplary method 600 for performing compression of beamforming weights. At 602, a basis beamforming weight vector for IFFT operation can be generated. For this operation, it can be assigned that the beamforming coefficients BV can be expressed as follows $bV=[bV_0, bV_0, \ldots, bV_{K-1}]$. The basis beamforming weight vector $W_{m,n}$ may be generated using the following:

$$W_{m,n} = \left[ e^{j2\pi \frac{m*n}{K}} \right]_{m,n=0,\ldots,K-1} \quad (1)$$

where m corresponds to horizontal TRX/antenna ports and n corresponds to vertical TRX/antenna ports. FIG. 6b illustrates an exemplary mxn TRX/antenna ports grid assembly 610.

Referring back to FIG. 6a, at 604, the beamforming weight vector across different TRX/antenna ports can be converted to different domains using the IFFT operation. This operation can be expressed as follows:

$$cBV=WbV \quad (2)$$

In some implementations, if the distributed and/or remote units determine and/or received information about the basis vectors through the M-plane, the distributed unit can transmit a subset of values cBV and the remote unit can re-create the beamforming coefficient vector.

At 606, a predetermined threshold (which can be based on a specific implementation of a wireless communication system can be used to remove any lower power signals corresponding to one or more TRX/antenna ports subsequent to IFFT processing that was applied to antenna elements at 604. To implement such threshold-based processing, one or more beam space coefficients can be transmitted over the fronthaul interface. As part of the threshold-processing, beam space coefficient can be filtered. For example, if an absolute value of a beam space coefficient is less than the above predetermined threshold, the coefficient can be deemed inactive, i.e., the activeBeam spaceCoefficientMask is equal to '0' at that coefficient index and the index is not transmitted across the fronthaul link. A decompression algorithm (i.e., a reverse process performed by the receiving device) can assume a value of 0 for that coefficient. The following code can be used to implement process 600:

```
t = 0
for k = 1 to K
    if abs(cBV(k)) < threshold
        activeIndex(k) = 0
        cBV(k) = null          // remove the element from
                                  the vector
    else
        activeIndex(k) = 1
        t = t + 1
    end if
end for
T = t
// Calculate scaler
maxValue = max(abs(Re(cBV)),abs(Im(cBV)))|
blockScaler = maxValue /* scaler can be chosen to be larger than
maxValue. */
For iRe = 1 to T
    //Scale and round:
    Re(cBV(iRE)) = Quantize (Inverse(blockScaler) × Re(cBV(iRE))) /*
    Quantize could be truncate or round,
    Inverse can be implemented via look up table or other methods. */
    Im(cBV(iRE)) = Quantize (Inverse(blockScaler) × Im(fBV(iRE))) /*
    Quantize could be truncate or round,
    Inverse can be implemented via look up table or other methods. */
End
``` where cBV are compressed beamforming coefficients, blockScaler is a common scaler for compressed beamforming coefficients, and fBV are decompressed beamforming coefficients.

To decompress the beamforming coefficients, the following code can be used:

```
m = 0
for k = 1 to K
    if activeBeamspaceCoefficientMask (k) = 1
        //Scale
        fBSC(k) = blockScaler × cBV(m)
        m = m + 1
    else
        fBSC(k) = 0
    end if
end for
// Generate DFT basis matrix
for k = 1 to K
    for l = 1 to K
        W (k,l) = exp(-i*2*pi*k*l/(K)) // W is a K × K complex matrix
    end for
end for
fBV = W * fBSC
```

However, the above one dimensional IFFT/FFT processing is not effective for the purposes of compressing beamforming weights when the weights are used for both vertical and horizontal TRX/antenna ports. As shown by the absolute value of weight-IFFT bins plot 901 in FIG. 9a, using existing 1-dimensional IFFT compression mechanisms allows "leakage" of compression between IFFT bins. This makes the 1-dimensional compression ineffective in multi-dimensional space.

In some implementations, the current subject matter can be configured to apply N-dimensional IFFT/FFT processing for compressing beamforming weights of processing chains or links (TRX) and/or antenna ports in one or more remote units (and/or any other units) that, for example, can be associated with one or more digital-to-analog and/or analog-to-digital converters and/or any other elements, components, devices. Due to digital beamforming, the number of TRXs may exceed the number of spatial streams, and, due to analog beamforming, the number of TRXs may be lower than the number of antenna elements. An antenna port can be defined such that the channel over which a symbol on the antenna port is conveyed can be inferred from the channel over which another symbol on the same antenna port is conveyed. The N-dimensional IFFT/FFT processing for compressing beamforming weights of TRX/antenna ports can be performed with multiple dimensions (e.g., horizontal, vertical, subcarrier, time, polarization, etc.). In some, non-limiting, illustrative implementations, low mobility (e.g., corresponding to N=3) scenarios, 3-dimensional IFFT/FFT processing (e.g., corresponding to horizontal, vertical and subcarrier dimensions) can be performed. In alternate, non-limiting, illustrative implementations, high-mobility scenarios (e.g., corresponding to N=4) scenarios, 4-dimensional IFFT/FFT processing (e.g., corresponding to horizontal, vertical, subcarrier and time dimensions) can be performed. Further, the current subject matter can be configured to perform dynamic switching of dimensional processing in view of different allocations that may be determined based on user channel/mobility conditions. Alternatively, or in addition to, the current subject matter can be configured to dynamically determining scaling weights for different dimensions for the purposes of the N-dimensional compression of beamforming coefficients. Moreover, the current subject matter may be configured to determine a threshold parameter for selecting one or more channel components, where the threshold parameter can be determined in accordance with a particular user, per slot allocation, a static configuration, and/or using any other desired way.

In some implementations, dimensions for compression of beamforming weights can be determined along antenna panel dimensions (e.g., M, N), frequency (e.g., K), time (e.g., L), antenna polarization (e.g., P), as well as any other dimensions. Any subset of dimensions for compression can be considered for compression. For example, in a 2-dimensional compression, one or more of the following exemplary, non-limiting combinations of dimensions may be used for compression of coefficients: (M, N), (M, K), (N, K), (K, L), etc. Likewise, in a 3-dimensional compression, one or more of the following exemplary, non-limiting combinations of dimensions may be used for compression of coefficients: (M, N, K), (M, N, L), (M, K, L), (N, K, L), etc. As can be understood, any combination of dimensions may be used. The current subject matter is not limited to the 2- and 3-dimensional compression and can be used to perform compression of coefficients in any number of dimensions and/or any combination of dimensions. Such multi-dimensional compression is advantageous in that it can allow reduction of payload, conservation of bandwidth, and more effective operation of the network. The choice of dimensions for compression can be allocation based, that is, for example, for allocation 1 2D compression along (M, N) can be performed, for allocation 2 3D compression along (M, N, K) can be performed, etc. and this information can be dynamically indicated to the remote unit for each allocation.

In some implementations, to determine beam space compression, the current subject matter may be configured to assume that the beamforming coefficients can be expressed as follows: $b=[b_0, \ldots, b_{K-1}]$, where the coefficients can be rearranged into N-dimensions (m1, m2, m3, etc.) as $fBV_{j_1, j_2, j_3}, \ldots$. The dimensions, for instance, can be j1=frequency range (e.g., 1 to m1), j2=azimuth range (e.g., 1 to m2), j3=elevation range (e.g., 1 to m3), etc. For example, in a 3-dimensional compression, the compressed beam space coefficients can be determined using the following equation:

$$cBV_{p_1,p_2,p_3} = \sum_{j_1=0}^{m_1-1} w_1 e^{\frac{i2\pi j_1 p_1}{m_1}} \sum_{j_2=0}^{m_2-1} w_2 e^{\frac{i2\pi j_2 p_2}{m_2}} \sum_{j_3=0}^{m_3-1} w_3 e^{\frac{i2\pi j_3 p_3}{m_3}} fBV_{j_1,j_2,j_3} \quad (3)$$

where $w_1, w_2, w_3$ are the weights for different dimensions, and weights are selected such that they are normalized to unity, i.e., $w_1+w_2+w_3=1$.

If the distributed unit and radio unit know the basis vectors through the management plane (M-plane), such basis vectors can be used for the purposes of IFFT/FFT processing; however, as can be understood, the current subject matter can be extended to any types of basis vectors, user/user-group defined basis vectors, and/or any other vectors. The compressed coefficients cBV can be linearized to form a K-dimensional vector, where K =m1*m2*m3*, etc. Subsequent to that, the distributed unit can be configured to transmit a subset of values of compressed coefficients vector cBV, where the subset can be determined based on a predetermined threshold parameter. In some implementations, the threshold parameter can be determined for every allocation, semi-statically indicated, statically configured, and/or determined in any other way. The following code can be used in connection with the threshold parameter:

```
for k = 1 to K
  if abs(cBV(k)) < threshold
    activeIndex(k) = 0
    cBV(k) = null              // remove the element from
                                  the vector
  Else
    activeIndex(k) = 1
    t = t + 1
  end if
end for
T = t
// Calculate scaler
maxValue = max(abs(Re(cBV)),abs(Im(cBV)))
blockScaler = Inverse(maxValue)
scaler can be chosen to be smaller than Inverse(maxValue). Inverse can be
implemented via look up table or other methods.
For iRe = 1 to T
  //Scale and round:
  Re(cBV(iRE)) = Quantize (blockScaler × Re(cBV(iRE))) /* Quantize
  could be truncate or round */
  Im(cBV(iRE)) = Quantize (blockScaler × Im(fBV(iRE))) /* Quantize
  could be truncate or round */
End
```

Only threshold- quantized coefficients cBV can be sent from the distributed unit to radio unit.

In some implementations, the following code can be used for executing the above functionalities (by way of an illustrative example only, the functionalities are executed for a 3-dimensional space, but can be applicable to any N-dimensional space):

```
// Generate 3D-IFFT basis matrix
Input = fBV a 3 dimensional matrix
Initialize cBV, a matrix of compressed values MxNxT, with zeros
for p = 1 to M
  for q = 1 to N
    for r = 1 to T
      for j = 1 to M
        for k = 1 to N
          for s = 1 to T
            cBV(p, q, r) = cBV(p, q, r) +
```

$$\frac{w_1*w_2*w_3}{M*N*T} e^{\frac{i2\pi(j-1)(p-1)}{M}} e^{\frac{i2\pi(k-1)(q-1)}{N}} e^{\frac{i2\pi(s-1)(r-1)}{T}} fBV(j, k, s)$$

```
          end for
        end for
      end for
    end for
  end for
end for
``` where $w_1, w_2, w_3$, can be used to form weights for different dimensions and, as stated above, can be configured and communicated to the remote unit per allocation, semi-statically, statically, and/or in any other way.

In some implementations, each allocation can have different dimensions for compression, which can be dynamically, semi-statically, statically, and/or in any other way indicated to the remote unit. Subsequent to the compression of beamforming weights, the weights can be compared against a threshold and only substantial power components (e.g., power signals greater than a predetermined power threshold) can be transferred over the interface between the distributed unit and the remote unit. The power threshold can be configured per allocation, semi-statically, statically, and/or in any other desired way.

In some implementations, the remote/receiving unit can decompress the signal using the following process. In this process, the inputs can include cBV that refer to compressed beamforming coefficients, a blockScaler refers to a common scaler for compressed beamforming coefficients, an active- BeamspaceCoefficientMask refers to active beam space indices associated with the compressed beamforming vector. The outputs can include fBV that refer to decompressed beamforming vector of N complex elements. The following code can be used for the decompression process:

```
m = 0
for k = 1 to N
    if activeBeamspaceCoefficientMask (k) = 1
        //Scale
        fBSC(k) = blockScaler × cBV(m)
        m = m + 1
    else
        fBSC(k) = 0
    end if
end for
```

The process can then convert the vectorfBSC(k) into a multidimensional matrix, for example, in this case, a 3D matrix (of dimension M×N×T) was selected. The following code, where an input can include afBSC, a 3 dimensional matrix, can be used (at the beginning, fBV, a matrix of compressed values M×N×T, can be initialized with zeros):

```
for p = 1 to M
    for q = 1 to N
        for r = 1 to T
            for j = 1 to M
                for k = 1 to N
                    for s = 1 to T
                        fBV(p, q, r) = fBV (p, q, r) +
```
$$M*N*T\ e^{\frac{-i2\pi(j-1)(p-1)}{M}}\ e^{\frac{-i2\pi(k-1)(q-1)}{N}}\ e^{\frac{-i2\pi(s-1)(r-1)}{T}} fBSC(j,k,s)$$
```
            end for
        end for
    end for
end for
``` where the decompressed fBV(p, q, r) is compensated for the weights $w_1$, $w_2$, $w_3$ to get back the original beamforming weights.

Figure 7:
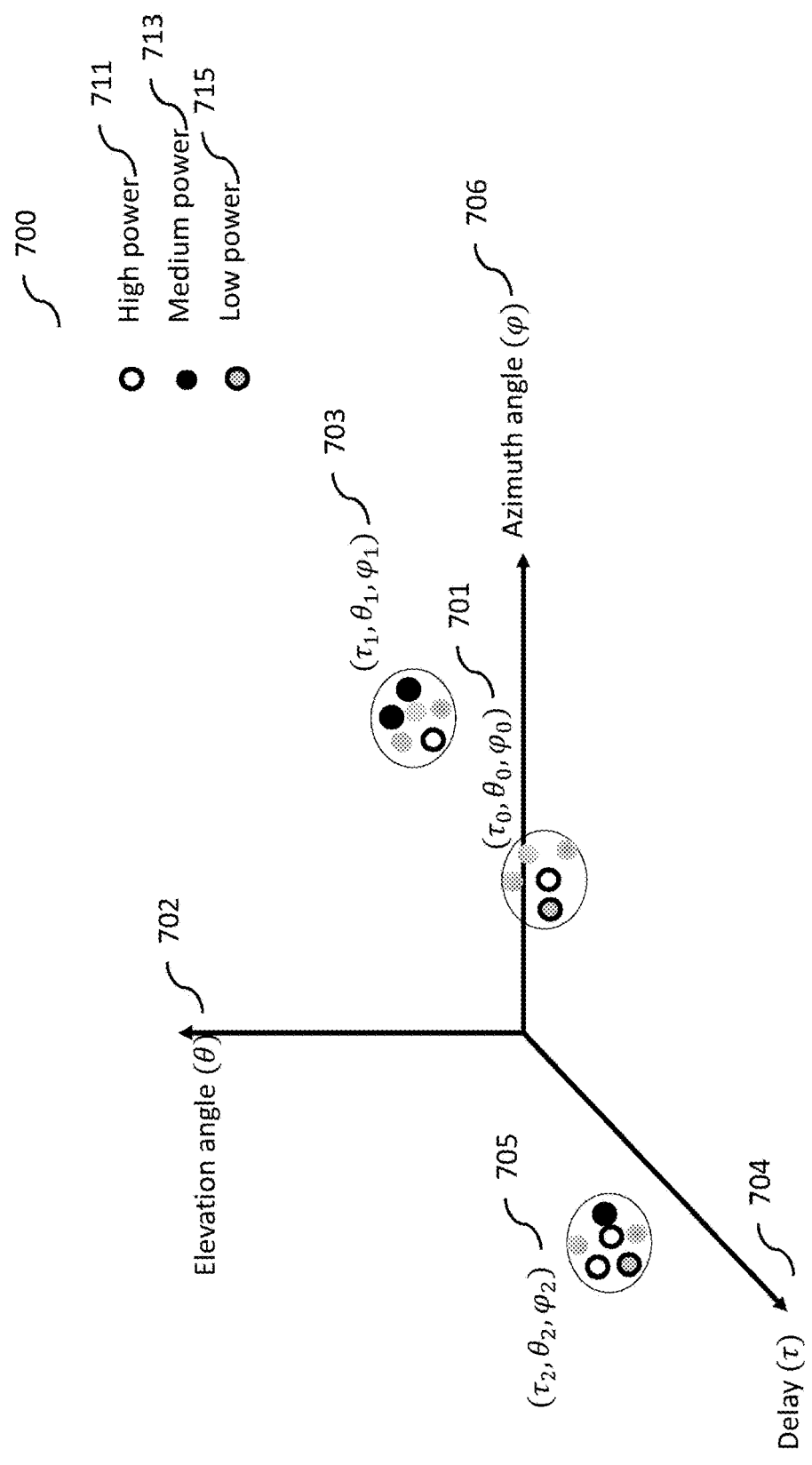
FIG. 7 is an exemplary plot illustrating compression of beamforming weight coefficients performed for a radio panel antenna in a spatial and delay domain, according to some implementations of the current subject matter.

FIG. 7 illustrates an exemplary spatial (2D) and delay (1D) domain compression plot 700 for a multi-dimensional antenna system, according to some implementations of the current subject matter. The plot 700 can include an elevation angle (θ) axis 702, an delay (τ) axis 704, and an azimuth angle (φ) axis 706, which can correspond to various dimensions that may be used to perform compression of beamforming weight coefficients. As shown in FIG. 7, the plot 700 illustrates compression of beamforming weight coefficients performed for a radio panel antenna having an 8×8 antenna structure (8×vertical×8horizontal×1polarization dimensions) in a spatial and delay domain. A wireless channel can be generated using CDL-C channel model and compressed as discussed above to generate one or more points 701, 703, 705. Each of the points 701-705 can include one or more coefficients that can correspond to one or more high power signals 711, medium power signals 713, and/or lower power signals 715. The power threshold levels corresponding to each of these signals can be defined as discussed above (e.g., per allocation, semi-statically, statically, etc.). The angle-delay domain can be configured compresses beamforming weight coefficients along 3 dimensions, thereby substantially reducing consumption of bandwidth in the interface between the distributed unit and the radio interface unit.

Figure 8A:
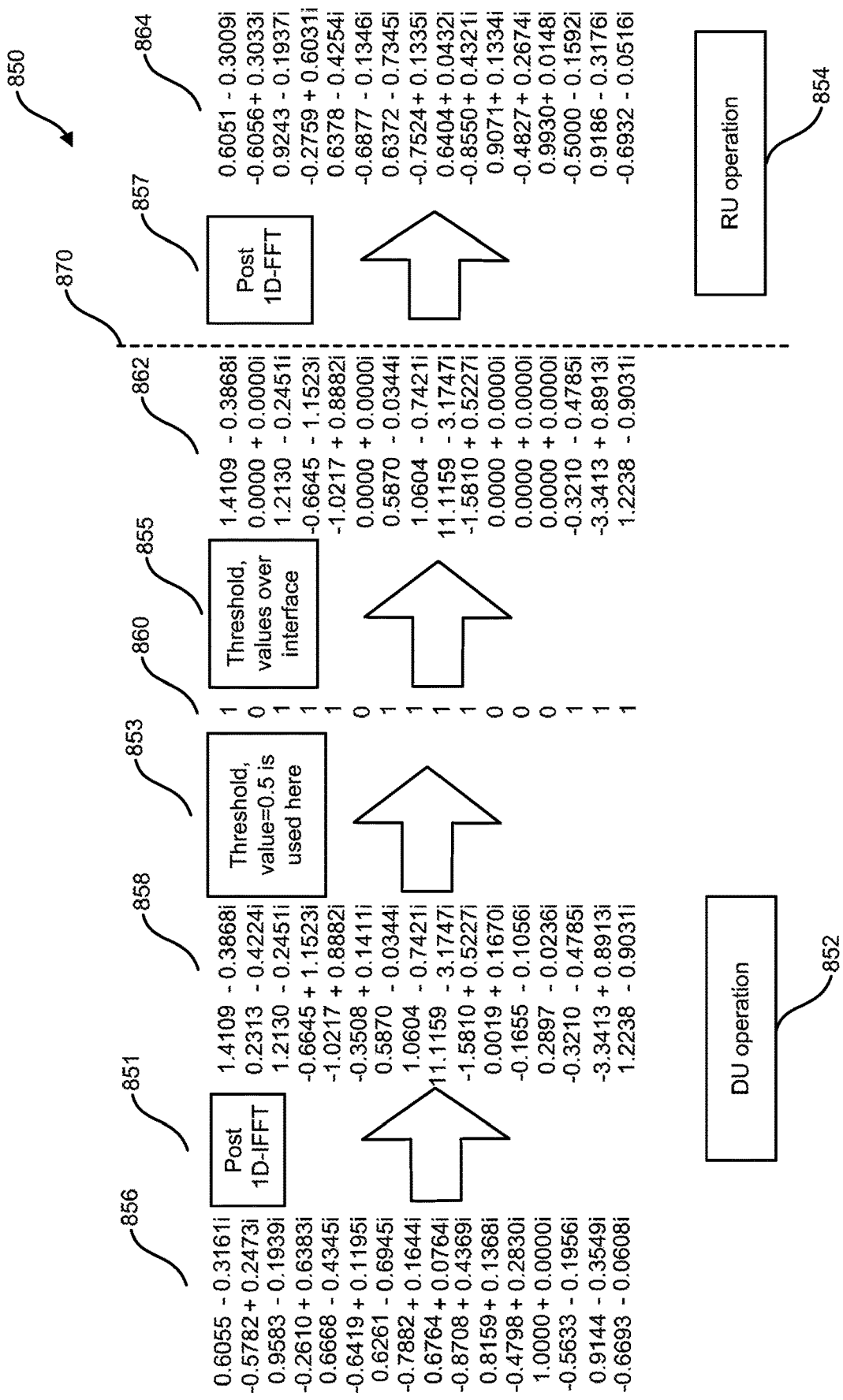
FIG. 8a illustrates an exemplary one-dimensional (e.g., 1-D) compression process.

FIG. 8a illustrates an exemplary one-dimensional (e.g., 1-D) compression process 850. The process 850 can be performed in two stages: a distributed unit operation 852 (as performed at a distributed unit) and a remote unit operation 854 (as performed at a remote unit). During operation 852, a post-IFFT (e.g., 1D-IFFT) processing can be applied by the distributed unit to one or more beamforming coefficients 856, at 851. As a result one or more processed coefficients 858 can be generated by the distributed unit.

Using a threshold value (e.g., threshold value=0.5 as shown in FIG. 8a) can be selected to remove coefficients corresponding to lower power signals of TRX/antenna ports, at 853. This results in coefficients 862, which are transmitted by the distributed unit to the remote interface unit over a fronthaul interface 870 communicatively coupling the distributed unit and the remote unit.

Once the coefficients are received from the distributed unit, the remote unit can be begin operation 854. A post-IFFT processing can be performed, at 857, on the received coefficients to generate coefficients 864.

Figure 8B:
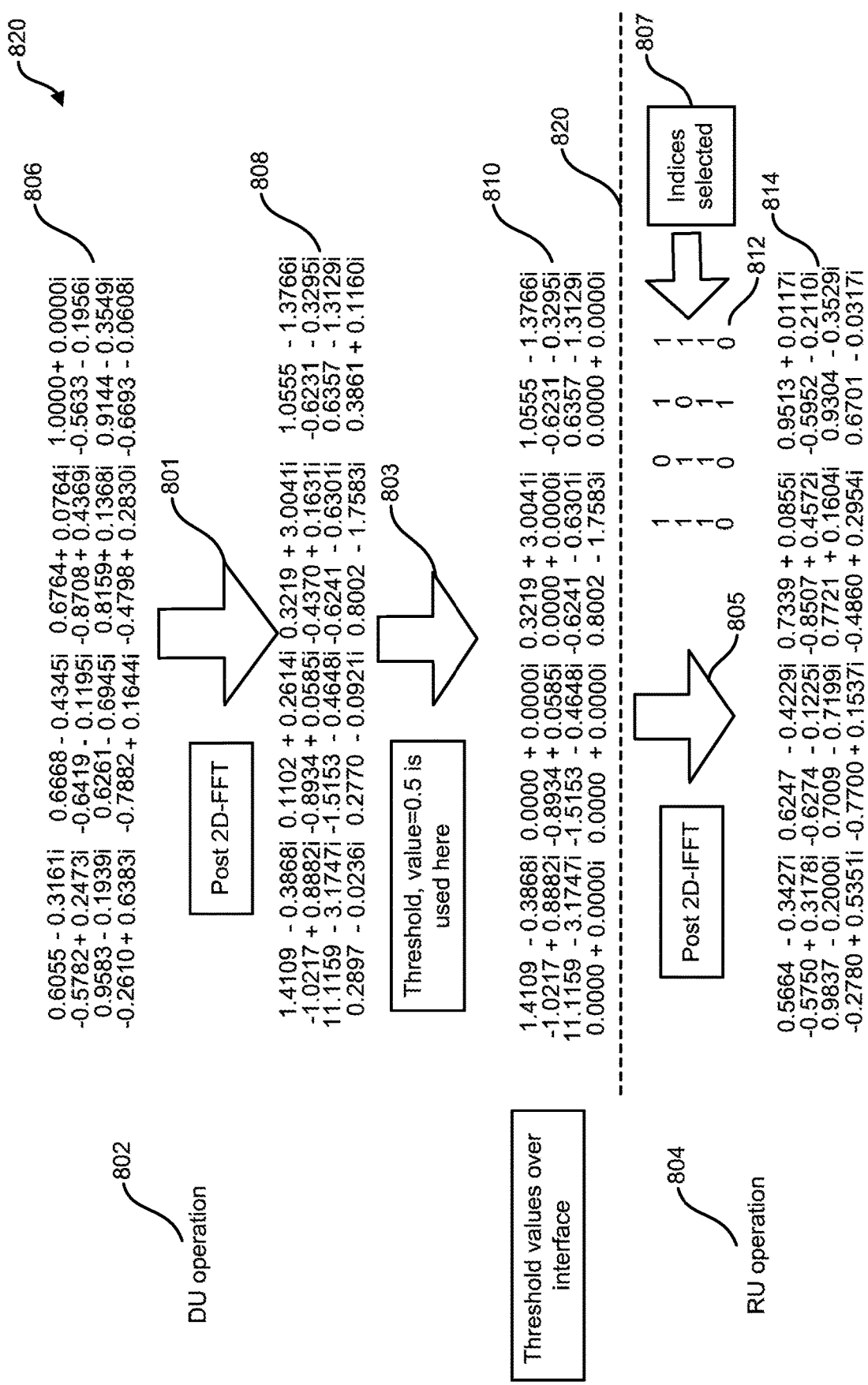
FIG. 8b illustrates an exemplary multi-dimensional (e.g., 2-D) compression process, according to some implementations of the current subject matter.

FIG. 8b illustrates an exemplary multi-dimensional (e.g., 2-D) compression process 800, according to some implementations of the current subject matter. The process 800 can be performed in two stages: a distributed unit operation 802 (as performed at a distributed unit) and a remote/receiving unit operation 804 (as performed at a remote unit). During operation 802, a post-IFFT (e.g., 2D-IFFT) processing can be applied by the distributed unit to one or more beamforming coefficients 806, at 801. As a result one or more processed coefficients 808 can be generated by the distributed unit.

Using a threshold value (e.g., threshold value=0.5 as shown in FIG. 8) can be selected to remove coefficients corresponding to lower power signals of antenna elements, at 803. This results in coefficients 810, which are transmitted by the distributed unit to the remote unit over a fronthaul interface 820 communicatively coupling the distributed unit and the remote unit.

Once the coefficients are received from the distributed unit, the remote unit can be begin operation 804. One or more indices 812 may be selected, at 812, to perform post-IFFT processing, at 805, of the received coefficients. The indices can be in a form of a matrix. The processing 805 can result in the coefficients 814.

Figure 9A:
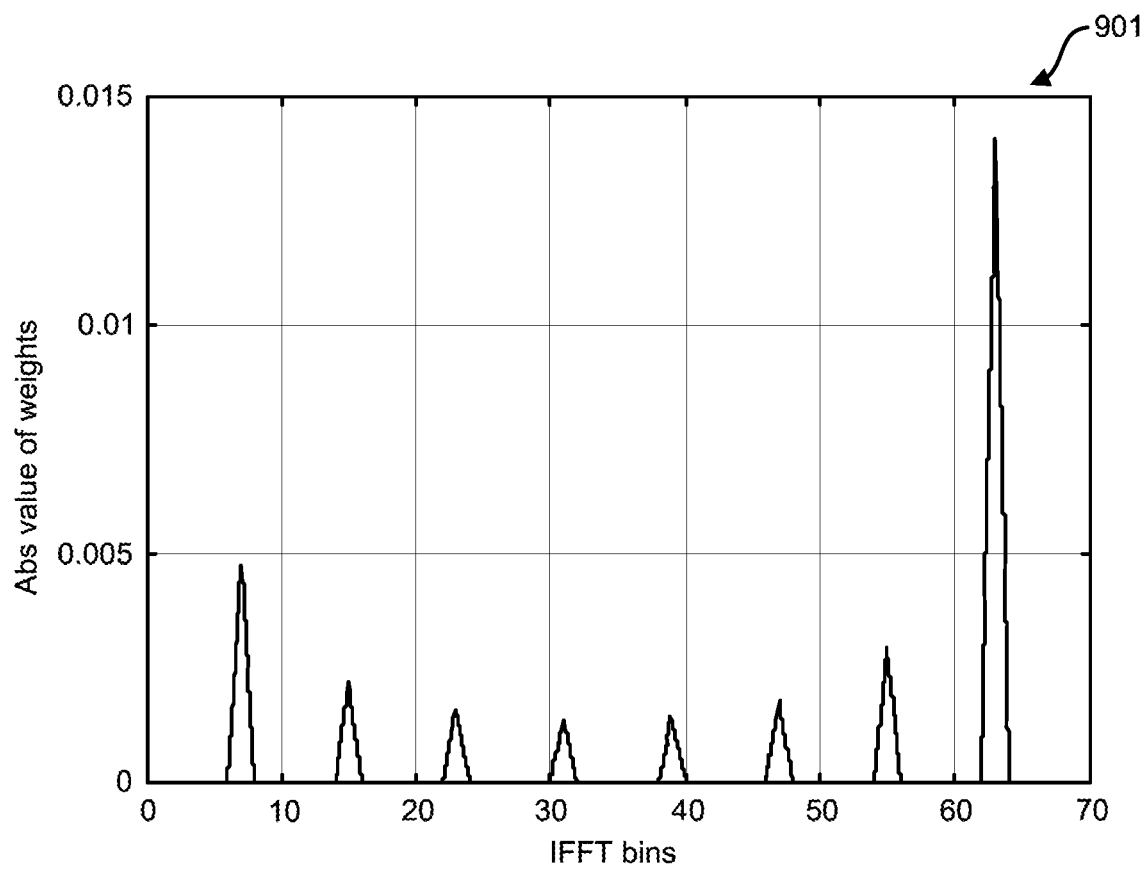
FIG. 9a is an exemplary plot illustrating a single-dimensional beam space compression, according to some implementations of the current subject matter.
Figure 9B:
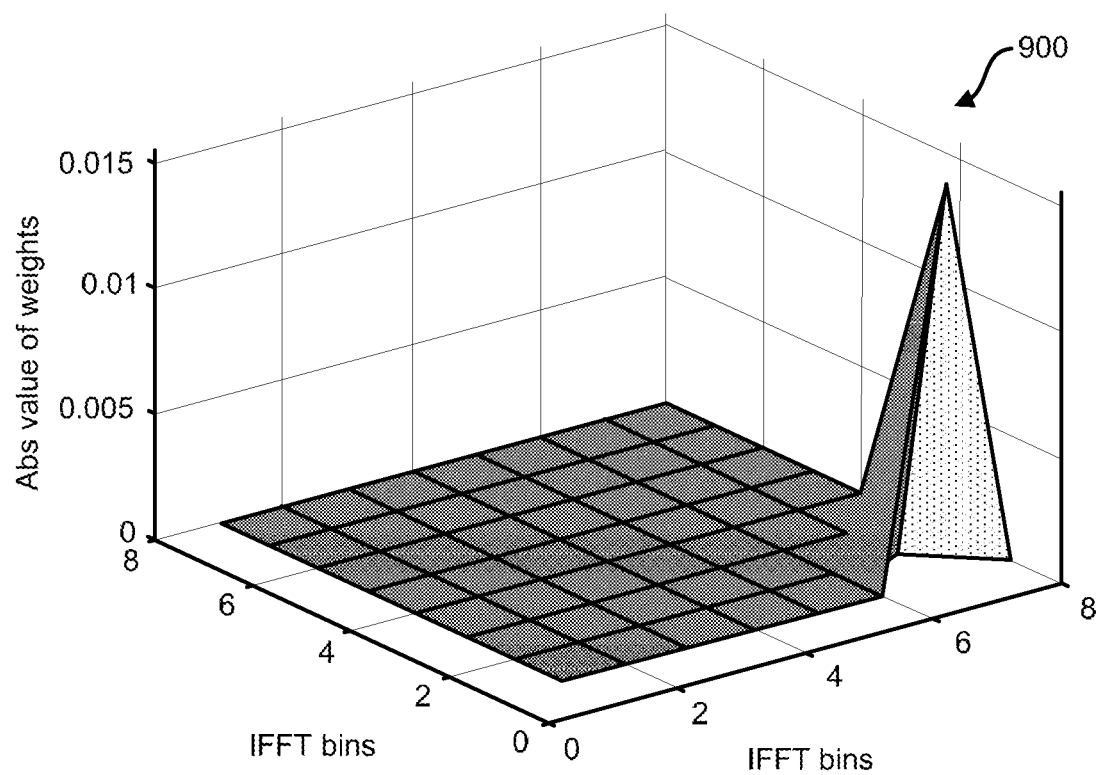
FIG. 9b is an exemplary plot illustrating a multi-dimensional, multi-domain beam space compression, according to some implementations of the current subject matter.

FIG. 9b illustrates an exemplary plot 900 illustrating a beam space compression, according to some implementations of the current subject matter. The plot 900 shows compression results for a radio panel antenna having an 8×8 antenna structure (8 vertical elements, 8 horizontal elements, and 1 polarization element). The plot 900 shows that signals can be compressed to a single IFFT bin for a multi-dimensional IFFT processing (which is different from the single-dimension IFFT processing, where compression can "leak" to other IFFT bins, as shown in FIG. 9a).

Figure 10B:
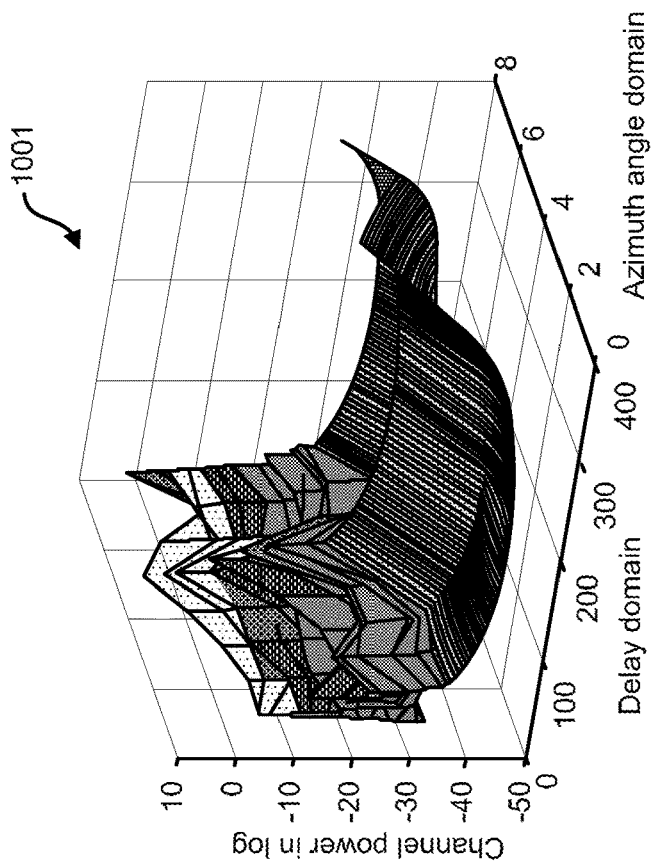
FIGS. 10a-b are exemplary plots illustrating multi-dimensional (e.g., 2D) compression of beamforming coefficients in various domains, according to some implementations of the current subject matter.
Figure 10A:
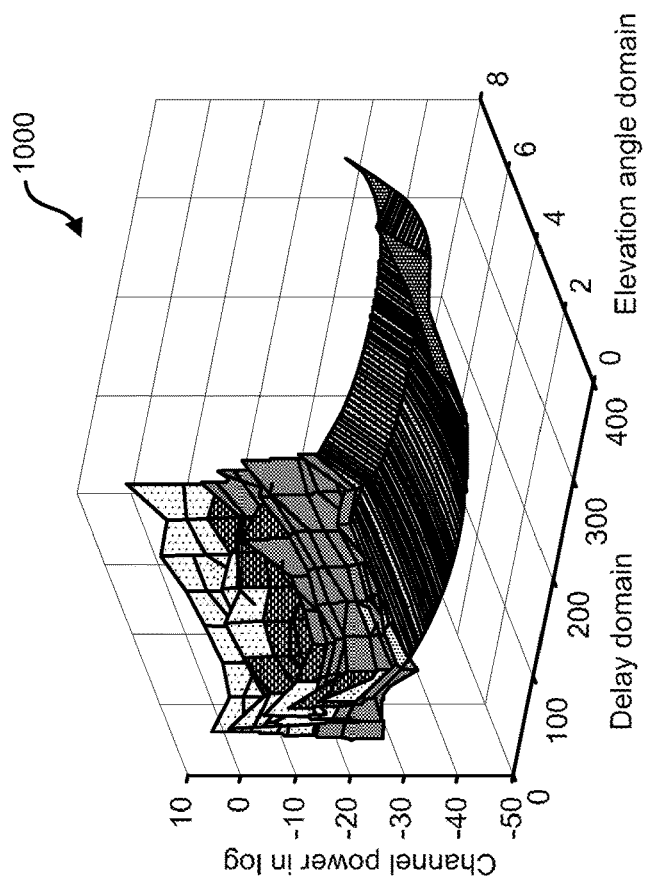

FIGS. 10a-b are exemplary plots 1000-1001 illustrating multi-dimensional (e.g., 2D) compression of beamforming coefficients in various domains, according to some implementations of the current subject matter. The plots 1000-1001 are shown for performing compression in spatial and delay domains. As can be understood, any domains can be used for the purposes of performing compression. The plots 1000-1001 are illustrated for a radio panel antenna that has 8×8 antenna structure (e.g., 8 vertical elements×8horizontal elements×1polarization element) in spatial and delay domain. In particular, the plot 1000 shown in FIG. 9a is a channel power versus delay and elevation angle domains, where compression is performed using 2D-IFFT (as can be understood, any dimension IFFT processes can be performed). The plot 1000 shown in FIG. 9b is a channel power versus delay and azimuth angle domains, where compression is also performed using 2D-IFFT (as can be understood, any dimension IFFT processes can be performed). As shown in FIGS. 9a-b, the angle-delay domain compression provides a significant compression to the beamforming weights, thereby reducing consumption of bandwidth in the interface between the distributed unit and remote unit.

Figure 11:
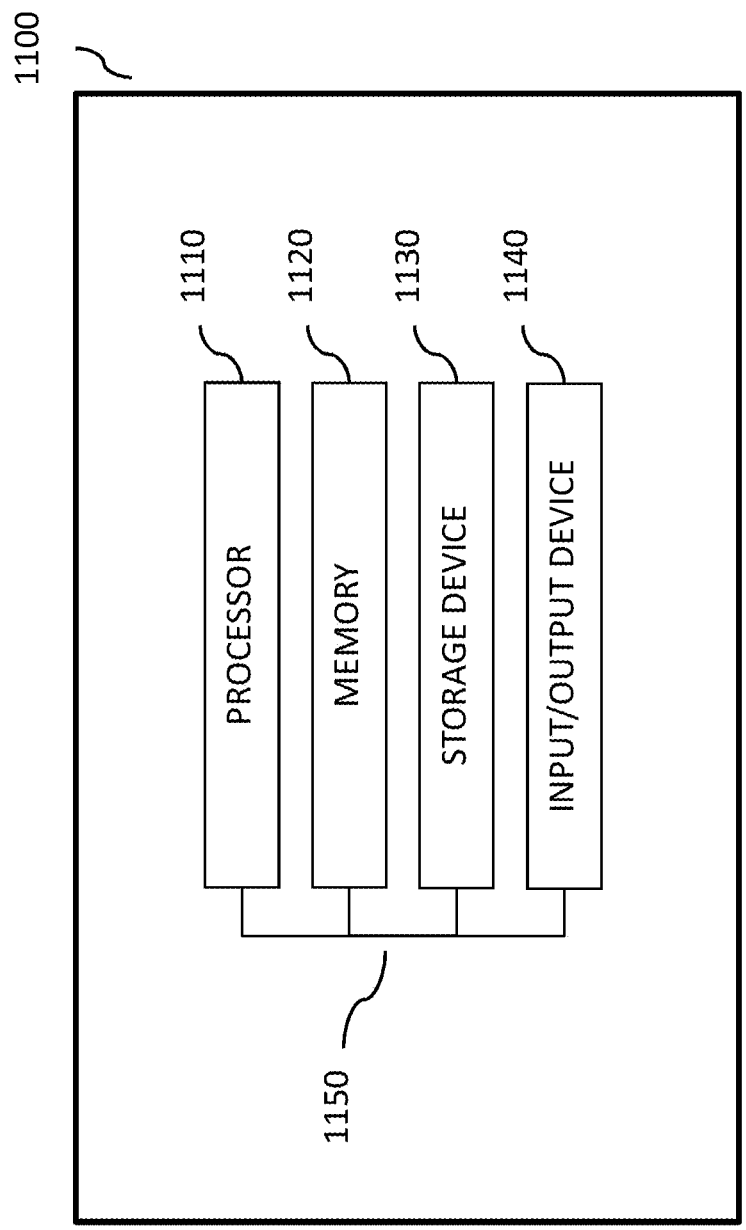
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
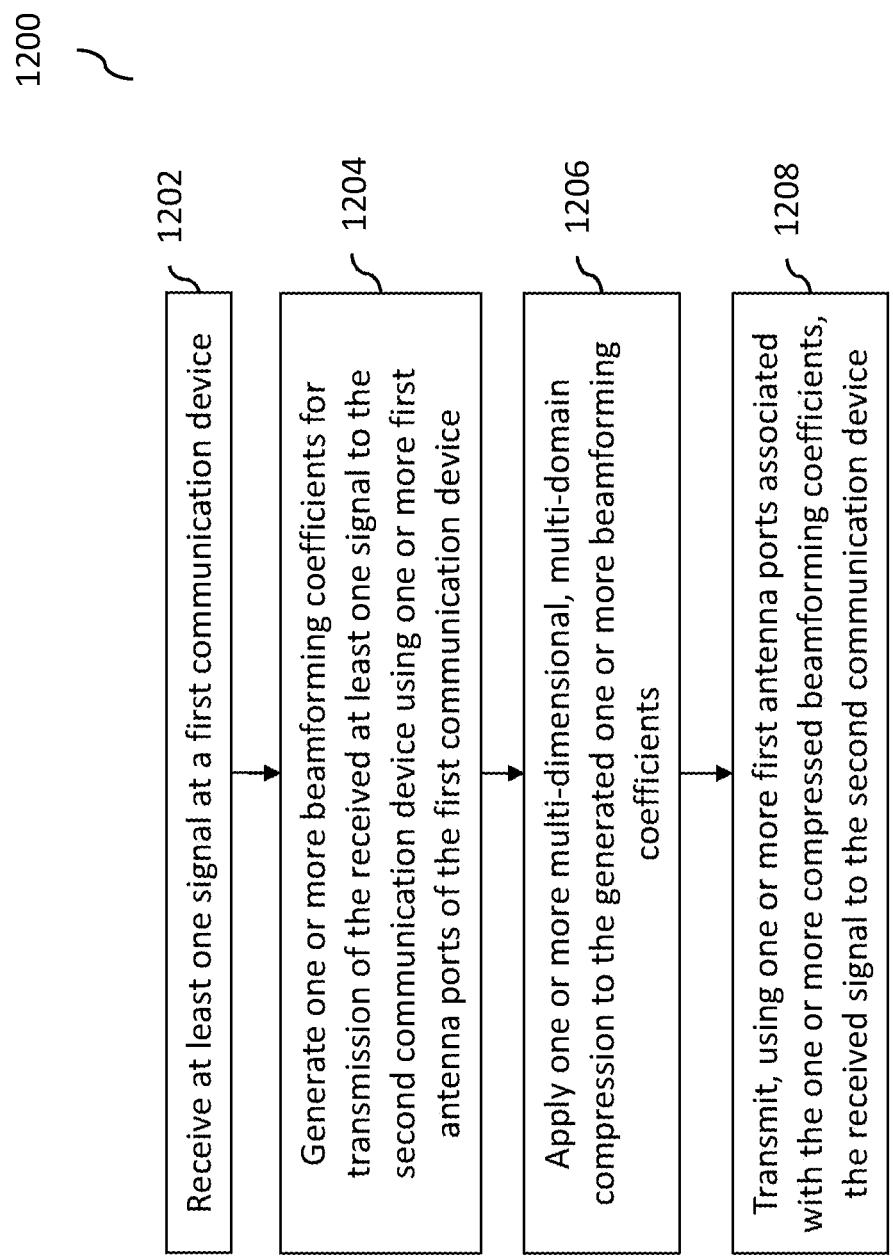
FIG. 12 illustrates an exemplary method, according to some implementations of the current subject matter.

FIG. 12 illustrates an exemplary method 1200 for performing beam space compression (e.g., beamforming weight coefficient compression), according to some implementations of the current subject matter. At 1202, at least one signal can be received at a first communication device (e.g., a distributed unit). The first communication device can be communicatively coupled (e.g., via an appropriate interface) to a second communication device (e.g., radio interface unit or a remote unit) using at least one communication interface (e.g., a fronthaul link). At 1204, one or more beamforming coefficients (e.g., cBV) for transmission of the received signal to the second communication device using one or more first TRX/antenna ports of the first communication device can be generated.

At 1206, one or more multi-dimensional, multi-domain compression (e.g., N-dimensional IFFT/FFT) can be applied to the generated one or more beamforming coefficients. At 1208, the received signal can be transmitted to the second communication device using one or more first TRX/antenna ports associated with the compressed beamforming coefficients.

In some implementations, the current subject matter can include one or more of the following optional features. In some implementations, a base station can include at least one of the first communication device and the second communication device. At least one of the first communication device and the second communication device can include at least one of the following: one or more radio interface units, one or more distributed units, and any combination thereof The distributed units can be configured to interface with the radio interface units for the transmitting of data packets. The first communication device can include a distributed unit, and the second communication device can include a radio interface unit. The first communication device and the second communication device can be communicatively coupled using a fronthaul link.

In some implementations, the beamforming coefficients can include one or more beamforming weights (as discussed above). The beamforming weights can be configured to be compressed in at least one of: one or more different dimensions, one or more different domains, and any combination thereof The beamforming weights can be configured to include at least one of the following: user/user-group defined beamforming weights, dynamically determined beamforming weights, statically determined beamforming weights, semi-statically determined beamforming weighs, and any combination thereof. The compressed beamforming weights can be transmitted to the second communication device using the at least one communication interface.

The applying can include applying one or more multi-dimensional, multi-domain inverse fast Fourier transform processing to the beamforming weights. Each user/user-group defined beamforming weight can be configured to be compressed in one or more different dimensions or one or more different domains. The different dimensions can include at least one of the following: a single-dimensional compression, a two-dimensional compression, a three-dimensional compression, a multi-dimensional compression, and any combination thereof. The beamforming weights associated with compression in the one or more different dimensions and/or one or more different domains can be determined based on at least one or more radio resources associated with the at least one communication interface and transmitted by the first communication device to the second communication device via the at least one communication interface.

In some implementations, the method can further include determining, based on the applying, transmission power levels of the first TRX/antenna ports, comparing the determined transmission power levels to one or more predetermined threshold power levels, and selecting, based on the comparing, at least one first TRX/antenna port in the first TRX/antenna ports having a power level greater than the one or more predetermined threshold power levels for the transmitting.

In some implementations, the transmitting can include transmitting the received signal using multiple input multiple output processing. The multiple input multiple output processing can include at least one of the following: a single-site multiple input multiple output processing, a multiple-site multiple input multiple output processing, and a distributed multiple input multiple output processing.

In some implementations, the base station can include at least one of the following: a base station, an eNodeB base station, a gNodeB base station, a wireless base station, a wireless access point, and any combination thereof. The base station can be a base station operating in at least one of the following communications systems: a long term evolution communications system, a new radio communications system, and/or a wireless communication system.

In some implementations, the compression can be performed using at least one of the following domains: a spatial domain, a delay domain, Doppler domain, a frequency domain, a multi-path domain, a time domain, an azimuth angle domain, an elevation angle domain, a vertical antenna dimension, a horizontal antenna dimension, an antenna polarization dimension, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving at least one signal at a first communication device, the first communication device being communicatively coupled to a second communication device using at least one communication interface;
generating one or more beamforming coefficients for transmission of the received at least one signal to the second communication device using one or more first antenna ports of the first communication device;
applying one or more multi-dimensional, multi-domain compression to the generated one or more beamforming coefficients; and
transmitting, using one or more first antenna ports associated with the one or more compressed beamforming coefficients, the received signal to the second communication device.

2. The method according to claim 1, wherein a base station includes at least one of the first communication device and the second communication device.

3. The method according to claim 2, wherein at least one of the first communication device and the second communication device include at least one of the following: one or more radio interface units, one or more distributed units, and any combination thereof.

4. The method according to claim 3, wherein the one or more distributed units is configured to interface with the one or more radio interface units for the transmitting of the one or more data packets.

5. The method according to claim 3, wherein the first communication device includes a distributed unit, and the second communication device includes a radio interface unit.

6. The method according to claim 1, wherein the first communication device and the second communication device are communicatively coupled using a fronthaul link.

7. The method according to claim 1, wherein the one or more beamforming coefficients include one or more beamforming weights.

8. The method according to claim 7, wherein the one or more beamforming weights are configured to be compressed in at least one of: one or more different dimensions, one or more different domains, and any combination thereof.

9. The method according to claim 8, wherein the one or more beamforming weights are configured to include at least one of the following: user/user-group defined beamforming weights, dynamically determined beamforming weights, statically determined beamforming weights, semi-statically determined beamforming weighs, and any combination thereof;
wherein the one or more compressed beamforming weights are transmitted to the second communication device using the at least one communication interface.

10. The method according to claim 9, wherein the applying includes applying one or more multi-dimensional, multi-domain inverse fast Fourier transform or any other domain/dimensional transformation mechanism processing to the one or more beamforming weights.

11. The method according to claim 9, wherein each user/user-group defined beamforming weight is configured to be compressed in one or more different dimensions or one or more different domains;
wherein the one or more different dimensions include at least one of the following: a single-dimensional compression, a two-dimensional compression, a three-dimensional compression, a multi-dimensional compression, and any combination thereof.

12. The method according to claim 11, wherein the beamforming weights associated with compression in the one or more different dimensions and/or one or more different domains are determined based on at least one or more radio resources associated with the at least one communication interface and transmitted by the first communication device to the second communication device via the at least one communication interface.

13. The method according to claim 10, further comprising
determining, based on the applying, transmission power levels of the one or more first antenna ports;
comparing the determined transmission power levels to one or more predetermined threshold power levels; and
selecting, based on the comparing, at least one first antenna port in the one or more first antenna ports having a power level greater than the one or more predetermined threshold power levels for the transmitting.

14. The method according to claim 1, wherein the transmitting further comprises transmitting the received signal using multiple input multiple output processing.

15. The method according to claim 14, wherein the multiple input multiple output processing includes at least one of the following: a single-site multiple input multiple output processing, a multiple-site multiple input multiple output processing, and a distributed multiple input multiple output processing.

16. The method according to claim 2, where the base station includes at least one of the following: a base station, an eNodeB base station, a gNodeB base station, a wireless base station, a wireless access point, and any combination thereof.

17. The method according to claim 16, wherein the base station is a base station operating in at least one of the following communications systems: a long term evolution communications system, a new radio communications system, a wireless communication system, and any combination thereof.

18. The method according to claim 1, wherein the compression is performed using at least one: or more of the following domains: a spatial domain, a delay domain, Doppler domain, a frequency domain, a multi-path domain, a time domain, an azimuth angle domain, an elevation angle domain, a vertical antenna dimension, a horizontal antenna dimension, an antenna polarization dimension, and any combination thereof.

19. A system comprising:
at least one programmable processor; and
a non-transitory machine-readable medium storing instructions that, when executed by the at least one programmable processor, cause the at least one programmable processor to perform operations comprising:
receiving at least one signal at a first communication device, the first communication device being communicatively coupled to a second communication device using at least one communication interface;
generating one or more beamforming coefficients for transmission of the received at least one signal to the second communication device using one or more first antenna ports of the first communication device;
applying one or more multi-dimensional, multi-domain compression to the generated one or more beamforming coefficients; and
transmitting, using one or more first antenna ports associated with the one or more compressed beamforming coefficients, the received signal to the second communication device.

20. A computer program product comprising a non-transitory machine-readable medium storing instructions that, when executed by at least one programmable processor, cause the at least one programmable processor to perform operations comprising:
receiving at least one signal at a first communication device, the first communication device being communicatively coupled to a second communication device using at least one communication interface;
generating one or more beamforming coefficients for transmission of the received at least one signal to the second communication device using one or more first antenna ports of the first communication device;
applying one or more multi-dimensional, multi-domain compression to the generated one or more beamforming coefficients; and
transmitting, using one or more first antenna ports associated with the one or more compressed beamforming coefficients, the received signal to the second communication device.

\* \* \* \* \*